United States Patent

Johnson

[15] 3,657,659
[45] Apr. 18, 1972

[54] METHOD AND MEANS FOR MEASURING PHASE DIFFERENCE

[72] Inventor: Robert P. Johnson, Sun Valley, Calif.
[73] Assignee: The United States of America as represented by the Secretary of the Navy
[22] Filed: July 13, 1964
[21] Appl. No.: 382,697

[52] U.S. Cl. ............................. 328/133, 307/232, 307/261, 324/83 D, 340/16
[51] Int. Cl. ........................................................ H03d 13/00
[58] Field of Search ................. 324/83 D, 68 C; 328/44, 133, 328/157; 307/88.5; 340/6, 16, 347, 16, 1 C; 73/503, 518; 235/92 M–92 R

[56] References Cited

UNITED STATES PATENTS

| | | | |
|---|---|---|---|
| 3,079,522 | 2/1963 | McGarrell | 324/83 A |
| 3,199,104 | 8/1965 | Miller | 324/68 C |
| 3,287,963 | 11/1966 | Stanya et al. | 340/1 C |
| 2,735,005 | 2/1956 | Steele | 250/27 |
| 2,984,111 | 5/1961 | Kritz | 73/517 |
| 3,016,475 | 1/1962 | Kirsten | 324/83 D |
| 3,021,481 | 2/1962 | Kalmus | 340/16 UX |

*Primary Examiner*—Benjamin A. Borchelt
*Assistant Examiner*—H. A. Birmiel
*Attorney*—Raymond I. Tompkins, Louis B. Applebaum and Philip Schneider

[57] ABSTRACT

1. Apparatus for obtaining an output signal whose value corresponds to the phase difference between two sinusoidal waves displaced in time comprising, in combination:

a first limiting amplifier connected to receive the earlier of said sinusoidal waves as its input;

a first pulse-forming means connected to receive as its input the output of said first limiting amplifier and to produce a spike pulse whenever a positive-going portion of the output wave of said first limiting amplifier crosses its zero axis;

a second limiting amplifier connected to receive the later of said sinusoidal waves as its input;

a second pulse-forming means connected to receive as its input the output of said second limiting amplifier and to produce a spike pulse whenever a positive-going portion of the output wave of said second limiting amplifier crosses its zero axis;

a bi-polar counter having a positive input and a negative input, said counter being connected to receive at its positive input the output of said first pulse-forming means and at its negative input the output of said second pulse-forming means, said counter providing a positive count for each pulse at its positive-signal input and subtracting one count for each pulse at its negative-signal input;

a digital-to-analog converter connected to receive as its input the output of said bi-polar counter and to provide a step output comprising a fixed increase in value for each pulse at the positive-signal input of said bi-polar counter and a corresponding fixed decrease in value for each pulse at the negative-signal input of said bi-polar counter, the increases and decreases being cumulative in effect; and low-pass filter means connected to receive as its input the output of said digital-to-analog converter, said filter means acting to average out the changes in the output wave of said converter.

1 Claims, 4 Drawing Figures

INVENTOR.
ROBERT P. JOHNSON
BY Philip Schneider
Louis B. Applebaum
ATTORNEYS

METHOD AND MEANS FOR MEASURING PHASE DIFFERENCE

This invention relates to phase-detection circuits and, more particularly, to a method on electrical system for measuring phase differences which are greater than 180°.

As the field of underwater operations has become increasingly active, a strong need has become apparent for a device which can accurately determine the location of an underwater object. This task is particularly difficult in the case of a moving object such as a submarine, torpedo, or survey instrument, where the motion of the object necessitates high speed of measurement. Acoustic measurements of the object may be made by bouncing a signal off the object and processing the echo, or by processing sounds emitted by the object itself or by an instrument which it carries.

Several types of energy-source direction finders employ the measurement of the difference in time-of-arrival of a signal pulse received at two or more points. The difference (or differences) can be determined by various conventional means of time-interval measurements, or by detecting the phase relationship between the received sinusoids, this relationship being a linear function of time difference. However, the difficulty with many prior art phase detectors is that the measurement of phase differences greater than ± 180° is ambiguous. The advantage of the present invention is that it provides a non-ambiguous measurement of phase differences greater than ±180°.

This non-ambiguous measurement of large phase differences is achieved through use of the concept of "vernier" phase measurement by the time-distribution averaging technique. A set of pulses is formed from each of the received sinusoidal signals, respectively, the position of each pulse corresponding to the positive-going axis-crossover point of one cycle of the sinusoid from which it is derived. Each pulse in the first received sinusoid causes a unit step increase in voltage and each pulse in the second received sinusoid causes a unit step decrease in the same voltage. Before the second sinusoid is received, the stepped voltage consists only of a series of increasing steps representing cycles of the first sinusoid, but after the second sinusoid is received, a rectangular wave is formed, the number of steps corresponding to the number of full cycles and the average value of the rectangular wave corresponding to the fractional part of a cycle by which the second sinusoid lags the first.

An object of the invention is to accurately measure large amounts of phase difference or time lag between two signals.

Another object is to accurately measure large amounts of phase difference or time lag between two sinusoidal signals.

Other objects and many of the attendant advantages of this invention will be readily appreciated as the same becomes better understood by reference to the following detailed description when considered in connection with the accompanying drawings wherein:

FIG. 3 is a block diagram illustrating a position-determining system with which the invention may be used.

Figure 1:
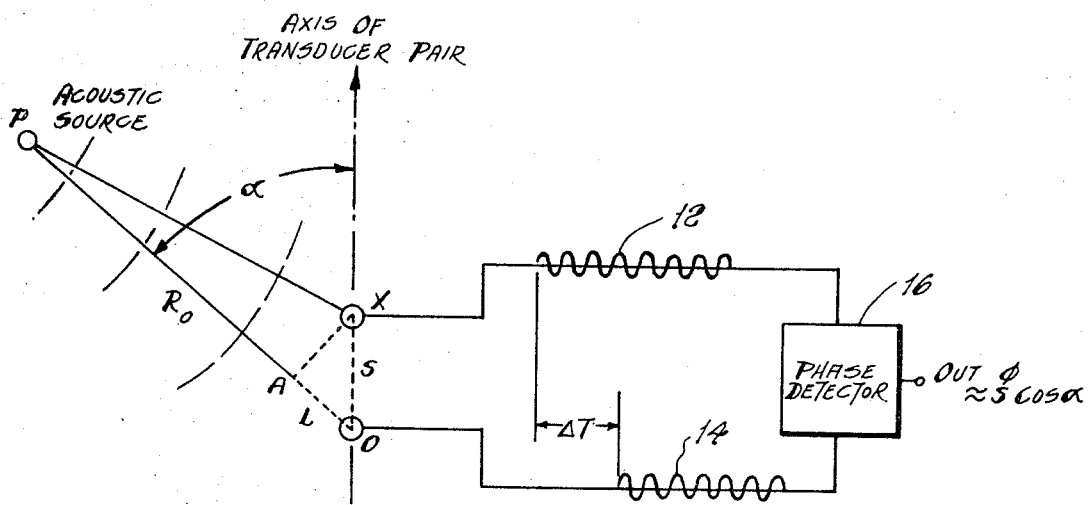
FIG. 1 is a schematic diagram illustrating the principle behind the measurement of the phase difference between two sinusoidal signals.

FIG. 1 illustrates the principle behind the measurement of the phase difference or time interval between two sinusoidal signals 12 and 14, the relationship being a linear function of time difference. When the range $R_o$ to the target source P is much greater than the spacing S of the receiving transducers O and X, the triangle AOX is nearly a right triangle and side L is proportional to the time-of-arrival difference $\Delta T$ and the phase difference $\phi$. Measurement of the time-of-arrival difference $\Delta T$ by a phase detector 16 will give an output proportional to $L = S \cos \alpha$. Thus, the angle $\alpha$ can be determined by this method, since S is known.

Figure 2:
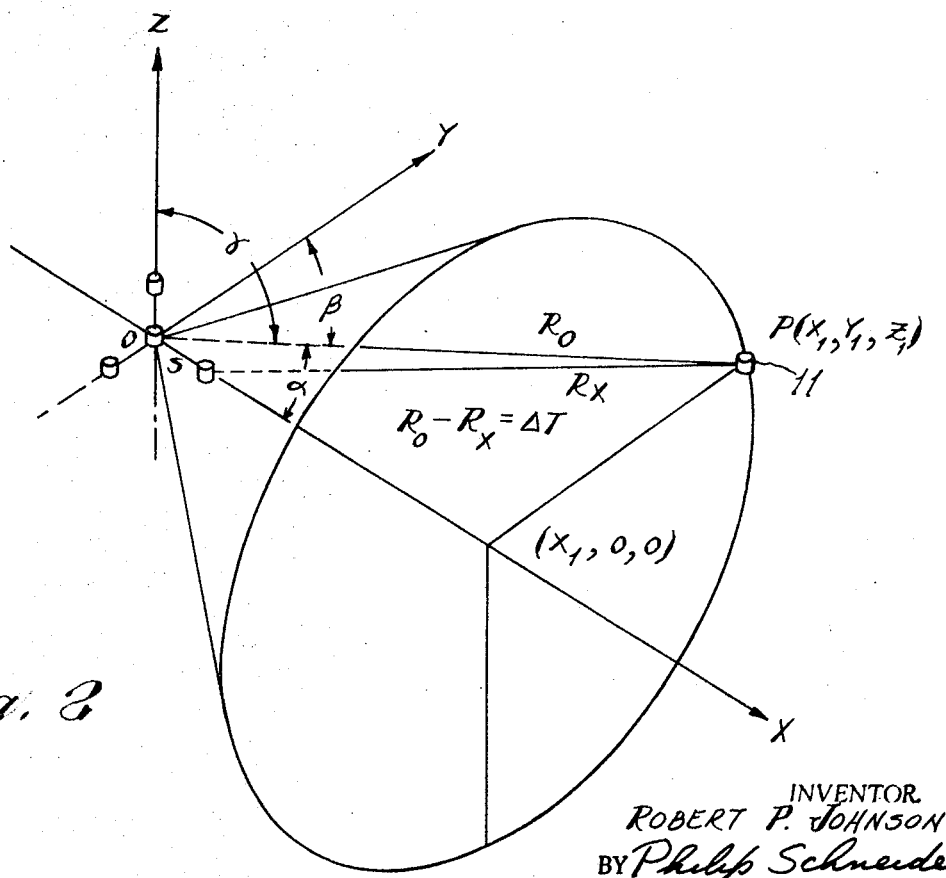

System geometry for obtaining angle cosines in three dimensions is shown in FIG. 2. The exact location of an acoustic source 11 can be defined by three angles and an acoustic range count. FIG. 2 gives a geometric representation of the receiving transducer array and an acoustic source displaced by an amount $X_1$ along the X axis. The exact formula for the coordinate $X_1$ is:

$$X_1 = R_o(\Delta T)/S + S/2 - (\Delta T)^2/2S \quad (I)$$

where $R_o$ is the spacing from the geometric origin 0 to the acoustic source P, S is the spacing between the receiving transducers on the X axis, and $\Delta T$ is the time-of-arrival difference measured between the X-axis transducers. Note that all of the above terms are expressed in seconds (that is, they are units of time), the propagation velocity of sound in water being the normalization factor between distance and time. Division of equation I by $R_o$ yields a direction cosine of the line OP:

$$X_1/R_o = \Delta T/S + S/2R_o - (\Delta T)^2/2R_o S = \cos \alpha \quad (II)$$

When the range $R_o$ is much greater than the spacing S, the terms $$S/2R_o$$

and $$(\Delta T)^2/2R_o S$$

become negligible and the following approximation is valid:

$$\Delta T = S \cos \alpha \quad (III)$$

Similar calculations relate the cosines of $\beta$ and $\gamma$ to the time differences measured along the Y and Z axes, respectively. The direction of the line-of-sound $R_o$ is thus described by the three $\Delta T$ measurements. This information, in conjunction with a range measurement, completely defines the position of the acoustic source with respect to the receiving array.

Figure 3:
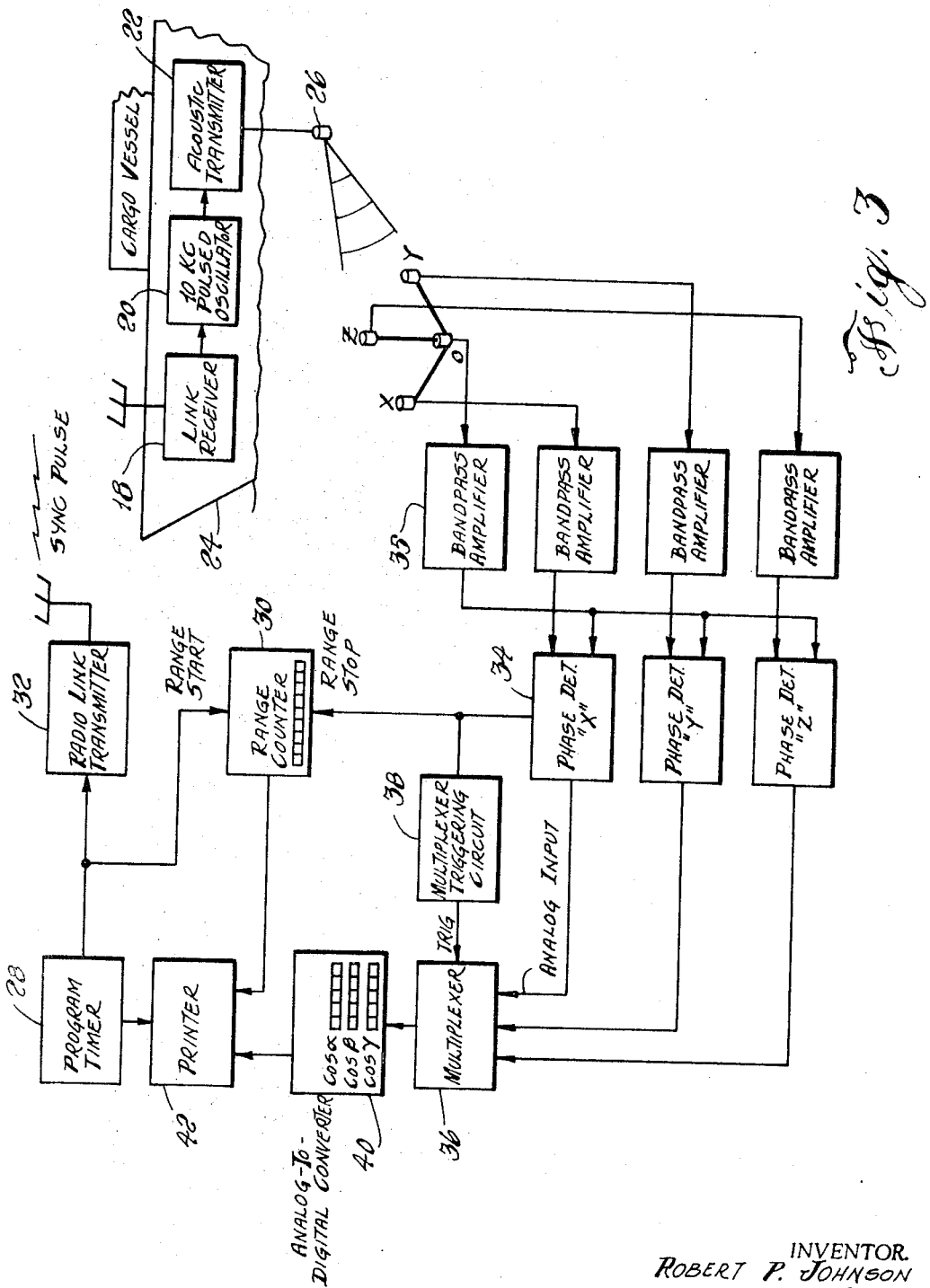
FIG. 3 is a diagram illustrating the system geometry for obtaining the angles of an acoustic source with respect to a three-orthogonal-axis system.

A position-determining system in which the phase detector which comprises the present invention can be used is shown in FIG. 3. Of course, the invention may be employed in many other environments so that the particular environment shown is not to be taken as limiting the use of the invention in any way. A radio link receiver 18 and a 10 kc. sonic pulse transmitter, 20 and 22, are located aboard a carrier vessel 24, and a transmitting transducer 26 is suspended beneath the vessel.

At the receiving location, the three-axis, receiving transducer assemblage comprising transducers O, X, Y and Z is connected to phase detectors 34 through separate bandpass filters 35. A program timer 28 initiates each operation by simultaneously starting the range counter 30 and keying the 10 kc. transmitter (20,22) by means of the radio link transmitter 32. The acoustic pulse is 2 msecs. long and propagates through the water at approximately 4,970 feet per second. The range counter 30 measures the acoustic path length by counting the output cycles of a reference oscillator at 4,970 cps so that the output can be read directly in feet. Upon the arrival of the leading edge of the acoustic pulse at transducer 0, a range-stop pulse is generated in phase detector X(34), which terminates the range count. The range value is displayed on four-digit light display on the front panel of the counter 30.

In the phase detectors 34, measurements are made of the time-of-arrival differences along the X, Y, and Z axes respectively. The voltage outputs of the phase detectors are analogous to the direction cosines of the line-of-sound. They appear at the inputs of the multiplexer 36 for approximately 1.5 msecs. A 1-millisecond delay in the multiplexer triggering circuit 38 allows time for stabilization of the pulsed analog input voltages prior to the multiplex read-out cycle.

When the multiplexer 36 is triggered, it samples each of the analog inputs for 60 msecs., while the analog-to-digital converter 40 digitizes them in sequence and stores the digital information in its three output registers. The 13-bit light displays, located on the converter front panel, give a binary-coded decimal representation of the direction cosines, each consisting of three digits and sign.

At the end of the multiplex cycle, a pulse from the multiplexer 36 triggers the printer 42, which begins a relatively slow printing sequence of the registered values of range, cos $\alpha$, cos $\beta$, and cos $\gamma$. For purposes of data identification, time and ping number are registered in the program timer 28 and printed along with each information group.

Figure 4:
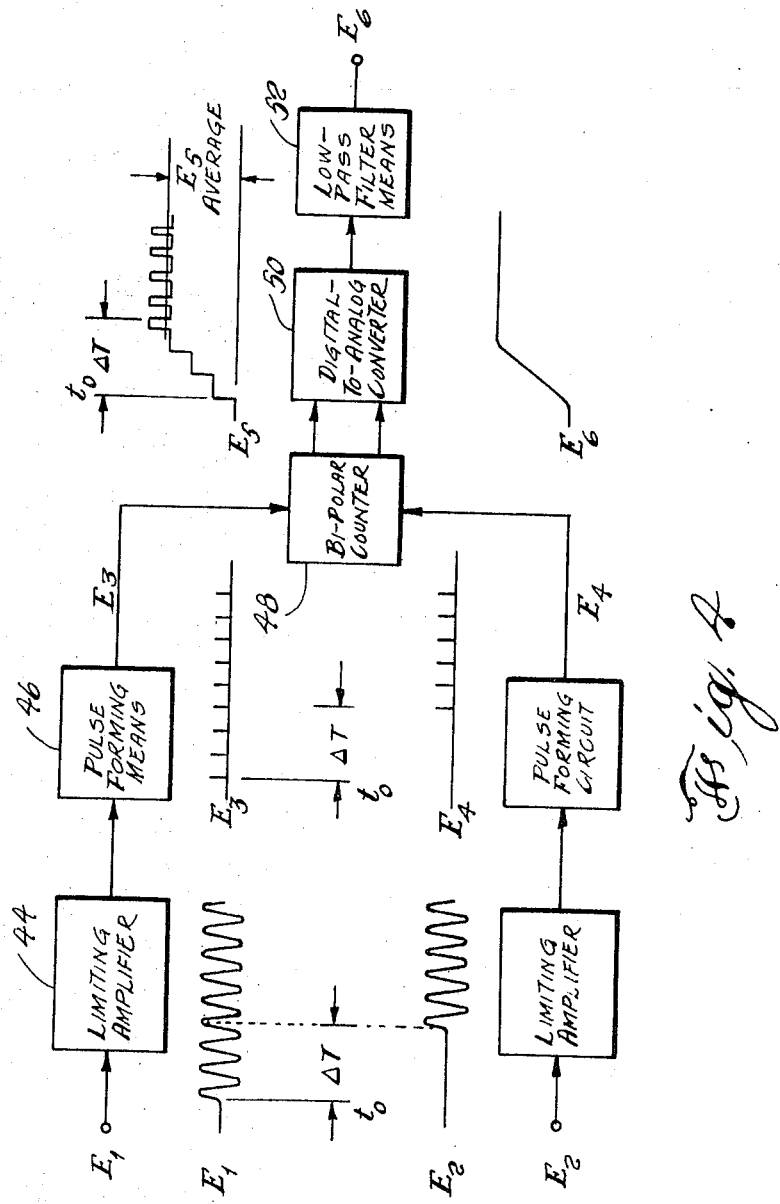
FIG. 4 is a block diagram of an embodiment of the invention.

FIG. 4 is a block diagram of an embodiment of the invention showing waveforms at selected points. The particular phase detector designed for use with the system of FIG. 3 has a measurement range of ± 2,520°, with a resolution and linearity comparable to conventional 180° phase detectors. (However, the invention is not limited to ± 2,520° but can be designed to measure any number of degrees of phase difference.)

The 10 kc signals from a pair of receiving transducers (e.g., transducers 0 and X) are amplified and clipped in the limiting amplifiers 44 to give square wave outputs. In the pulse-forming means 46, blocking oscillators generate 0.1 microsecond pulses of the same polarity (see waveforms $E_3$ and $E_4$) which correspond in time to the positive-going crossover points of the square waves. The bipolar counter 48 is a three-stage binary counter which responds with a positive count for each pulse at its positive-signal input and subtracts one count for each pulse at its negative-signal input. Since only a positive-going signal is effective to operate the bipolar counter 48, the input signals to the counter 48 ($E_3$ and $E_4$) are only spike pulses, i.e., their duration is not important and therefore is made extremely short to mark a point in time. Of course, the polarity of the pulses could be changed so long as all in the same pulse train are alike. This would simply necessitate a circuit change in the bipolar counter to effect proper operation with the new polarity. The digital output of the counter 48 controls a set of semi-conductor switches in the digital-to-analog converter 50 so that the converter output voltage varies rapidly in accordance with the value of the count. This voltage is very accurately regulated, e.g., 1 volt/step ± 0.05 percent, and each step represents 360° of phase difference between the two input sine waves. The voltage thus exists only at multiples of 1 v. However, when both input signals are present, it fluctuates between two consecutive multiples of 1 v., and its time distribution between these two states gives it an average value analogous to the exact phase difference. In the exemplary waveforms of FIG. 4, the phase difference is 3.25 cycles, or 1,170°. As the digital-to-analog converter output follows the positive counts initiated by $E_3$, it rises in four 1 v. steps, spaced 100 msecs. apart, to a level of 4 v. With the arrival of the first pulse of $E_4$ 25 msecs. later, it drops to 3 v. where it remains for 75 msecs. The 25 percent duty cycle of the ensuing rectangular wave provides "vernier" measurement of the fractional part of the phase difference. Averaging of the rectangular wave takes place in the low-pass filter means 25 which has a cutoff frequency of 2.5 kc and is 60 db down at 10 kc. Thus, multiplication of the value of the output wave by 360° gives the phase difference between the two input waves (e.g., 3.25 v. × 360° = 2,270°).

To ensure against the possibility of a false count in the phase detectors, the shape of the 10 kc pulse must be rigidly controlled. To achieve a waveform which nearly duplicates $E_1$ of FIG. 4, a ringing oscillator is used to drive the acoustic transmitter 22. Its output has the desired zero-start characteristic and no measurable change in frequency. To preserve the shape of the acoustic pulse, a transmitter bandwidth of 12 kc. is used. A 6 kc bandwidth in the receiving bandpass amplifiers 35 limits the amount of noise received without seriously affecting the rise time of the signal.

Circuits which accomplish the functions of the blocks forming the embodiment of the invention shown in FIG. 4 are well known in the electronics art. However, if desired, specific circuits can be found in Report No. 8–762, Volume II, "Operation and Maintenance Instruction Manual for the Position Determination System," printed by the Bendix Corporation, Bendix-Pacific Division, North Hollywood, Calif.

Obviously many modifications and variations of the present invention are possible in the light of the above teachings. It is therefore to be understood that within the scope of the appended claims the invention may be practiced otherwise than as specifically described.

I claim:

1. Apparatus for obtaining an output signal whose value corresponds to the phase difference between two sinusoidal waves displaced in time comprising, in combination:
    a first limiting amplifier connected to receive the earlier of said sinusoidal waves as its input;
    a first pulse-forming means connected to receive as its input the output of said first limiting amplifier and to produce a spike pulse whenever a positive-going portion of the output wave of said first limiting amplifier crosses its zero axis;
    a second limiting amplifier connected to receive the later of said sinusoidal waves as its input;
    a second pulse-forming means connected to receive as its input the output of said second limiting amplifier and to produce a spike pulse whenever a positive-going portion of the output wave of said second limiting amplifier crosses its zero axis;
    a bi-polar counter having a positive input and a negative input, said counter being connected to receive at its positive input the output of said first pulse-forming means and at its negative input the output of said second pulse-forming means, said counter providing a positive count for each pulse at its positive-signal input and subtracting one count for each pulse at its negative-signal input;
    a digital-to-analog converter connected to receive as its input the output of said bi-polar counter and to provide a step output comprising a fixed increase in value for each pulse at the positive-signal input of said bi-polar counter and a corresponding fixed decrease in value for each pulse at the negative-signal input of said bi-polar counter, the increases and decreases being cumulative in effect; and
    low-pass filter means connected to receive as its input the output of said digital-to-analog converter, said filter means acting to average out the changes in the output wave of said converter.

* * * * *